United States Patent [19]
Shohara et al.

[11] Patent Number: 5,651,181
[45] Date of Patent: Jul. 29, 1997

[54] METHOD OF MANUFACTURING A V-PULLEY

[75] Inventors: Hiroshi Shohara, Toyohashi; Haruo Suzuki, Nukata-gun, both of Japan

[73] Assignee: Nippondenso Co., Ltd., Kariya, Japan

[21] Appl. No.: 632,125

[22] Filed: Apr. 15, 1996

[30] Foreign Application Priority Data

Apr. 28, 1995 [JP] Japan .................................. 7-105945

[51] Int. Cl.$^6$ ............................................ B21K 1/42
[52] U.S. Cl. ............................ 29/892.3; 29/892; 72/68
[58] Field of Search ........................ 29/892, 892.2, 29/892.3; 72/68; 474/168, 170, 174

[56] References Cited

U.S. PATENT DOCUMENTS 5,123,166  6/1992  Kanemitsu et al. ................. 29/892.3
5,448,832  9/1995  Kanemitsu et al. ................. 29/892.3

FOREIGN PATENT DOCUMENTS 56-7775  2/1981  Japan .

*Primary Examiner*—P. W. Echols
*Attorney, Agent, or Firm*—Cushman, Darby & Cushman IP Group of Pillsbury Madison & Sutro LLP

[57] ABSTRACT

A ring-shaped flange is molded at one end of a cylindrically-shaped body in a flange molding process. In an edge surface molding process performed after the flange molding process, a cylindrically-shaped body thinner than a hot rolled steel plate, a truncated cone-shaped connecting portion extending in an axial direction from the body, and a smallest diameter portion thinner than the body at the other end of the body are molded. Next, in a slotting process, a slotting punch is driven in from the slanting surface of the connected portion to form the other guide-molded portion, and in a trimming process, the flange is trimmed off in order to remove the unnecessary volume to form a poly V-pulley from the work. In the above-described processes, even if the sash-shaped hot rolled steel plate has an uneven thickness, uneven thicknesses or fluctuations in precision of the hot rolled steel plate can be corrected in the middle of the press process, so that the rotation of the poly V-pulley can be prevented from fluctuating.

7 Claims, 12 Drawing Sheets

METHOD OF MANUFACTURING A V-PULLEY

CROSS-REFERENCE TO RELATED APPLICATIONS

The present application is related to and claims priority from Japanese Patent Application No. Hei. 7-105945, incorporated herein by reference.

BACKGROUND OF THE INVENTION

1. Field of the Invention

The present invention relates to a method of manufacturing a V-pulley employed for a V-belt to transmit rotational power. More specifically, it relates to a press molding method for forming a pair of belt guides at the outer periphery of such a pulley to control both sides of a poly V-belt and a poly V-pulley having a multi-stage V-groove between the belt guides.

2. Description of the Related Art

Japanese Patent Laid-Open Publication No. Sho. 56-7775 discloses a conventional method of manufacturing a V-belt pulley, i.e., so-called a V-pulley, where disc-shaped metal material is first pressed to form a double cylindrically-shaped pulley material, and secondly a pair of belt guides is molded at the outer periphery of the pulley material for regulating both sides of the V-belt.

However, when the disc-shaped metal material has an uneven thickness, it causes excessive or lack of volume in the inner and the outer cylindrical portions of the double cylindrically-shaped pulley material, which means the inner and the outer cylindrical portions cannot be accurately formed into desired cylindrical shapes when those portions are molded. In this case, when the edge surface of the outer cylindrical portion is slotted to mold a belt guide in the subsequent process, the diameter of the belt guide fluctuates and the outline of the belt guide cannot be formed into a complete circle. Consequently, the V-pulley has eccentricity caused by imbalanced and uneven thickness, so that a rotor including the V-pulley irregularly rotates, which causes a shorter life of the bearing of the rotor and abnormal abrasion of the rotor.

SUMMARY OF THE INVENTION

The present invention has an object of providing a method of manufacturing a V-pulley which enables prevention of the rotation of the V-pulley or a poly V-pulley from fluctuating by correcting any uneven thickness of the metal material in the midway of press processes, even if the thickness of the metal material is uneven. Another object of the present invention is to provide a press molding method of the poly V-pulley and press molding dies for use therein. Yet another object of the present invention is to provide a V-pulley and a poly V-pulley of which fluctuation at the time of rotation is small.

To achieve the above objects, the present invention provides a method of manufacturing a V-pulley having a pair of belt guides at the outer periphery thereof for regulating both sides of a V-belt which includes the steps of punching a sash-shaped metal material into disc shapes to punch out disc-shaped pulley material from the metal material, punching a fixing hole in the pulley material punched in that step and drawing one end of the pulley material to mold a substantially ring-shaped flange thinner than the metal material at one end of the pulley material, ironing the other end of the pulley material manufactured in that step to mold a cylindrically-shaped body thinner than the metal material in the axial direction from the inner periphery of the flange and molding a cylindrically-shaped smallest diameter portion at the top of the body, removing excessive volume from the pulley material manufactured in that step to mold a predetermined cylindrically-shaped pulley material having a pair of guide-molded portions serving as a base to mold the pair of belt guides wherein one guide-molded portion of the pair of the guide-molded portions is formed at one end of the body by trimming the flange of the pulley material manufactured in that step and the other guide-molded portion of the pair of guide-molded portions is molded at the other end of the body by slotting the outer periphery of the smallest diameter portion of the body of the pulley material manufactured in that step.

A cylindrically-shaped punch can be used for biting and slotting the other end of the body.

As noted above, disc-shaped pulley material is cut off from the metal material by punching the sash-shaped metal material into a disc shape.

Then, a round hole is punched in the disc-shaped pulley material and a drawing process is performed to one end of the disc-shaped pulley material to form a ring-shaped flange at one end of the pulley material. In this case, even if the thickness of the metal material is thinner than a predetermined thickness, the flange is molded thinner than the metal material, so that extra volume which is unnecessary to mold one of the belt guides is formed at the outer periphery of the flange in the diameter direction.

An ironing process is performed to the other end of the pulley material having the flange to mold a cylindrically-shaped body in the axial direction from the inner periphery of the flange and to mold a cylindrically-shaped smallest diameter portion at the top of the body. In this case, even if the thickness of the metal material is thinner than a predetermined thickness, the body and the smallest diameter portion are molded thinner than the metal material, so that extra volume which is unnecessary to mold the other belt guide is formed at the top of the smallest diameter portion in the axial direction. Since the body and the smallest diameter portion are molded thinner than the metal material, the body itself and the diameter direction of the smallest diameter portion do not have extra volume.

Then, the flange of the pulley material having the flange, body, and the smallest diameter portion is trimmed to mold one guide-molded portion at one end of the body. A slotting process is performed to the outer periphery of the smallest diameter portion of the body of the pulley material to mold the other guide-molded portion at the other end of the body. Thus, extra volume is removed from the pulley material serving as a base to mold a pair of belt guides, so that the pulley material is molded into a predetermined cylindrical shape.

In this way, even if the sash-shaped metal material has an uneven thickness, the uneven thickness of the metal material can be corrected so that the diameter of the pair of the belt guides will not fluctuate and the shape of the belt guides will become completely round. As a result, eccentricity of the V-pulley caused by imbalanced and uneven thickness can be prevented, thus, the rotation of the V-pulley does not fluctuate, which can suppress negative influence on the rotor rotating with the V-pulley.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

A preferred embodiment of manufacturing a poly V-pulley according to the present invention is hereinafter described with reference to the accompanying drawings.

Figure 1:
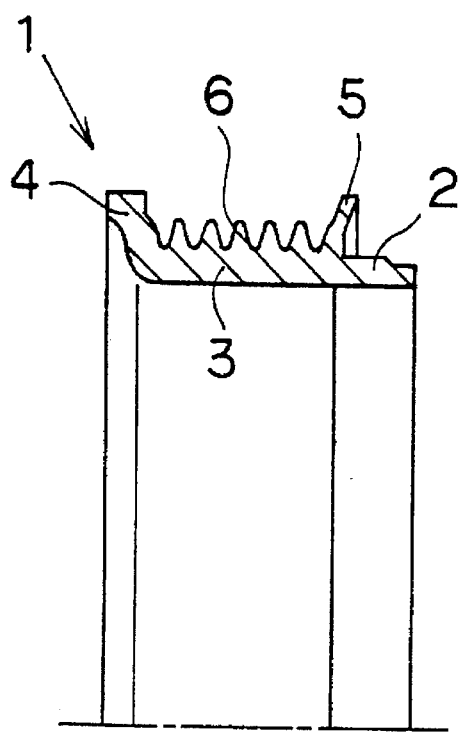
FIG. 1 is a cross-sectional view of a poly V-pulley manufactured according to an embodiment of the present invention.

FIG. 1 is a poly V-pulley manufactured according to an embodiment of the present invention.

A poly V-pulley 1 is a pulley for a poly V-belt, which is a component of a transmission device for transmitting rotary power from an internal combustion engine to the refrigerant compressor of an automotive air conditioner. Poly V-pulley 1 is brazed to the outer periphery of the rotor of an electromagnetic clutch to engage the internal combustion engine with the refrigerant compressor or to disengage it therefrom.

Poly V-pulley 1 has a cylindrically-shaped connected portion 2 connected to the outer periphery of the rotor (not shown), a cylindrically-shaped body 3 having the same inner diameter as connected portion 2, a pair of belt guides 4 and 5 formed at the outer periphery of body 3, and a multi-stage V-groove 6 formed at the outer periphery of body 3 between belt guides 4 and 5. The pair of belt guides 4 and 5 serve as regulating walls to support both sides of the poly-V belt and to prevent the poly V-belt (not shown) from coming off from poly V-pulley 1.

Figure 2:
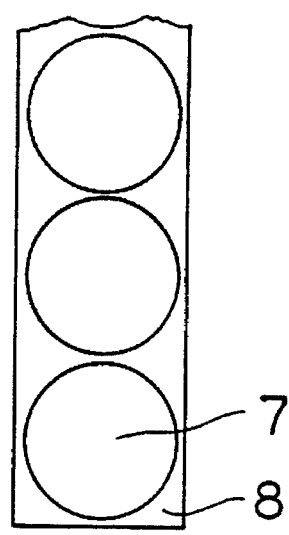
FIG. 2 is a top plan view of a hot rolled steel plate according to the embodiment.
Figure 3:
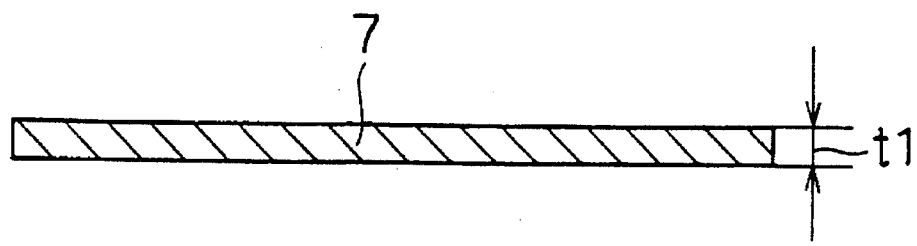
FIG. 3 is a cross-sectional view of a disc-shaped work according to the embodiment.

Next, a method of manufacturing poly V-pulley 1 is explained with reference to the accompanying drawings. FIGS. 2 and 3 show a work 7 molded into a disc shape in a disc punching process.

In this disc punching process, a sash-shaped hot rolled steel plate (a so-called rolled coil) 8 wound by a hot rolling mill (not shown) is punched (e.g., blanking and outline punching processes) by shearing it with a punch and a die of a press mold (not shown). By punching such disc shapes, many disc-shaped works (i.e., pulley material) 7 are molded from the sash-shaped hot rolled steel plate 8.

The thickness of hot rolled steel plate 8 is thicker than the thickness (e.g., t3=6.2 mm) of body 3 of poly V-pulley 1 as a final product shape, which is, for instance, t1=8 mm±0.4 mm, and its outer diameter is φ 150 min.

Figure 4:
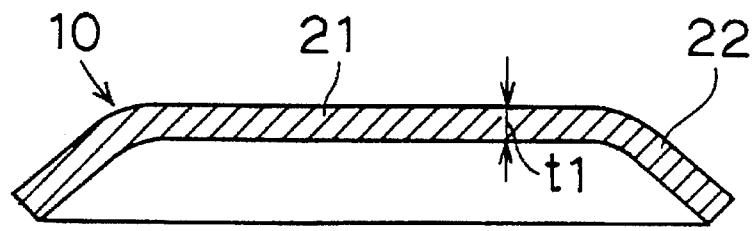
FIG. 4 is a cross-sectional view of a cup-shaped work with a bottom according to the embodiment.

FIG. 4 shows a work 10 molded into the shape of a cup with a bottom in a cup drawing process.

In this cup drawing process, a cup drawing process is performed with the punch and the die of a press mold (not shown) to mold a cup-shaped work with a bottom 10 from a disc-shaped work 7. Work 10 includes a disc-shaped bottom 21 and a side wall 22 extending peripherally outward at a predetermined angle from the outer periphery of bottom 21. The thickness of work 10 is, for example, t1=8 mm±0.4 mm.

Figure 5:
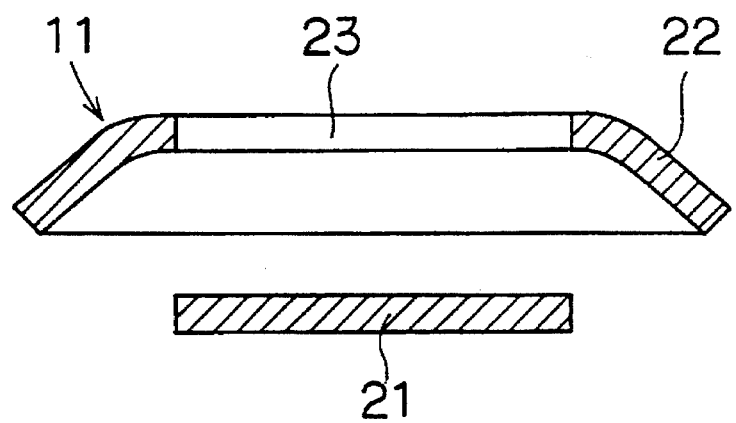
FIG. 5 is a cross-sectional view of a cup-shaped work without a bottom according to the embodiment.

FIG. 5 shows a work 11 molded into a cup shape without a bottom in a punching process.

In this punching process, bottom 21 of a cup-shaped work with a bottom 10 is cut out in a punching operation by shearing process with the punch and the die of a press mold (not shown) in order to mold cup-shaped work without the bottom 11 from cup-shaped work with the bottom 10. The shape of work 11 is formed by cutting out a round hole (e.g., φ 80 mm) 23 from disc-shaped bottom 21.

Figure 8:
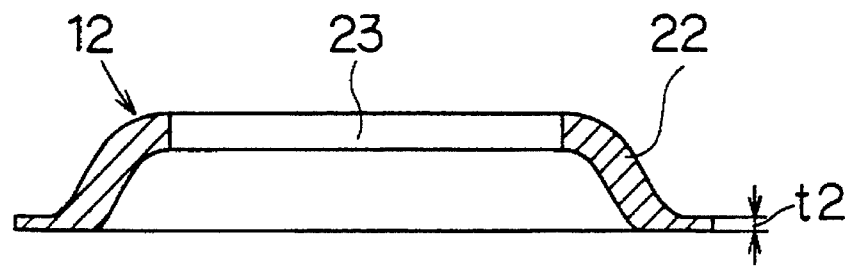
FIG. 8 is a cross-sectional view of a cup-shaped work without a bottom according to the embodiment.

FIGS. 6A–7B show a press mold 40 which performs a flange molding process. FIG. 8 shows a work 12 molded into a cup without a bottom by a press mold 40. Press mold 40 includes a die 41 having a shape permitting a change in the outer periphery of work 11 into a predetermined shape and a punch 42 having a shape permitting a change in the inner periphery of work 11 into a predetermined shape.

A push block 43 descends by driving power P1 to hold work 11 between die 41 and punch 42. A push plate 44 and a push bar 45 ascend by hydraulic power P2 to extrude work 12 from punch 42. Die 41 is cylindrically-shaped and has a molding portion on its inner periphery and its lower end surface for molding the upper end surface of a flange 24 and the outer periphery of side wall 22. Punch 42 has the shape of a cylindrical bar and also has a molding portion on its upper end surface and its outer periphery for molding the inner side surface of bottom 21 of work 12.

Figure 6A:
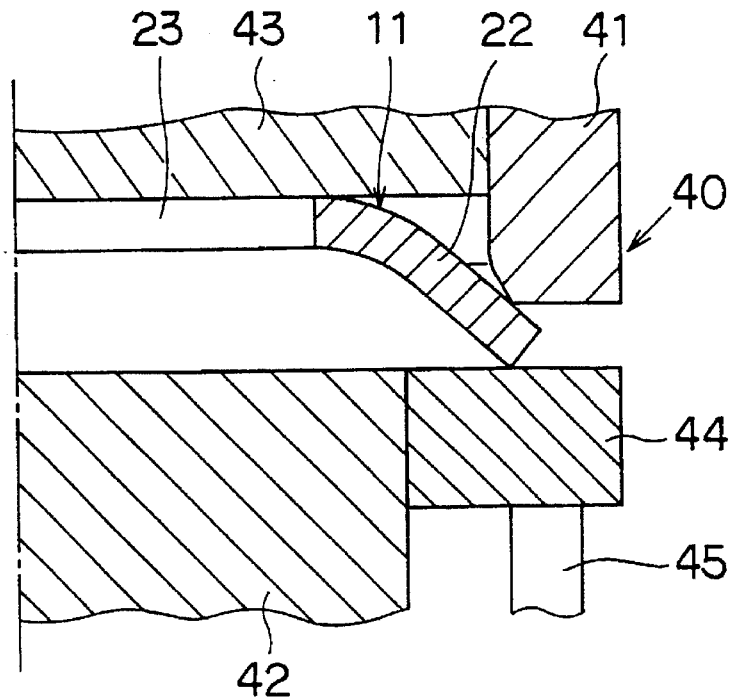
FIGS. 6A and 6B are cross-sectional views of a press mold for performing a flange molding process according to the embodiment.
Figure 6B:
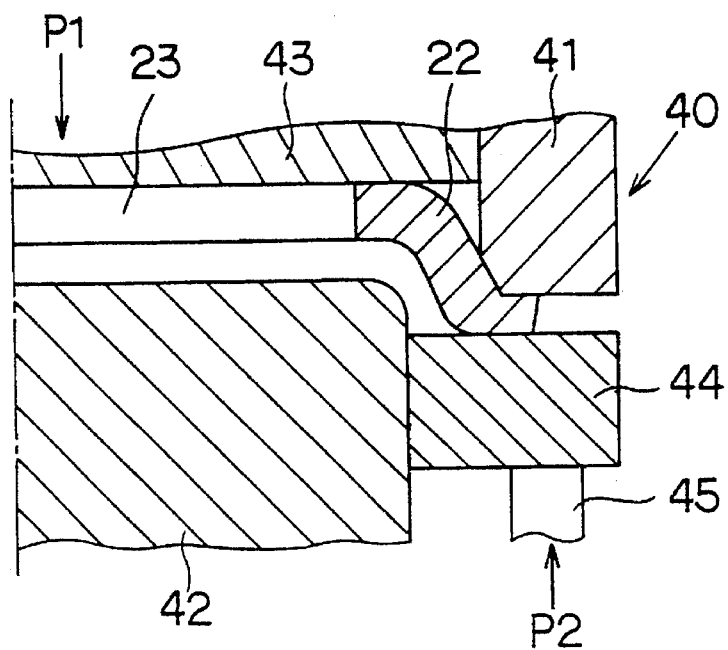

In this flange molding process, a flange molding process of a cup-shaped work without the bottom 11 is performed with die 41 and punch 42 of press mold 40. The flange molding process is briefly explained hereinafter based on FIGS. 6A–7B. First, a cup-shaped work without the bottom 11 is inserted in the press mold 40 to start the process as shown in FIG. 6A, then push block 43 descends by driving power P1 to lower work 11 (in the middle of the process). At this time, push plate 44 lifts work 11 by hydraulic power P2 which is smaller than driving power P1.

Figure 7A:
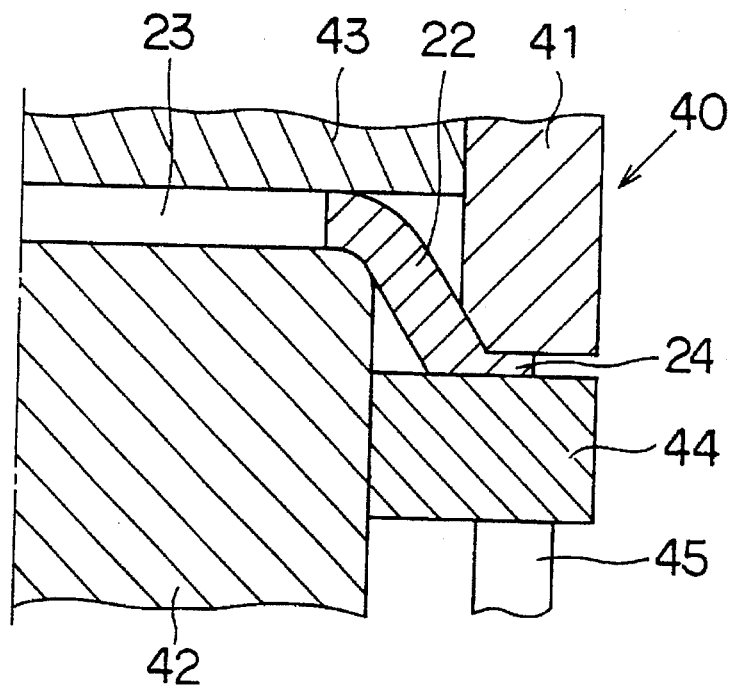
FIGS. 7A and 7B are cross-sectional views of the press mold for performing the flange molding process according to the embodiment.
Figure 7B:
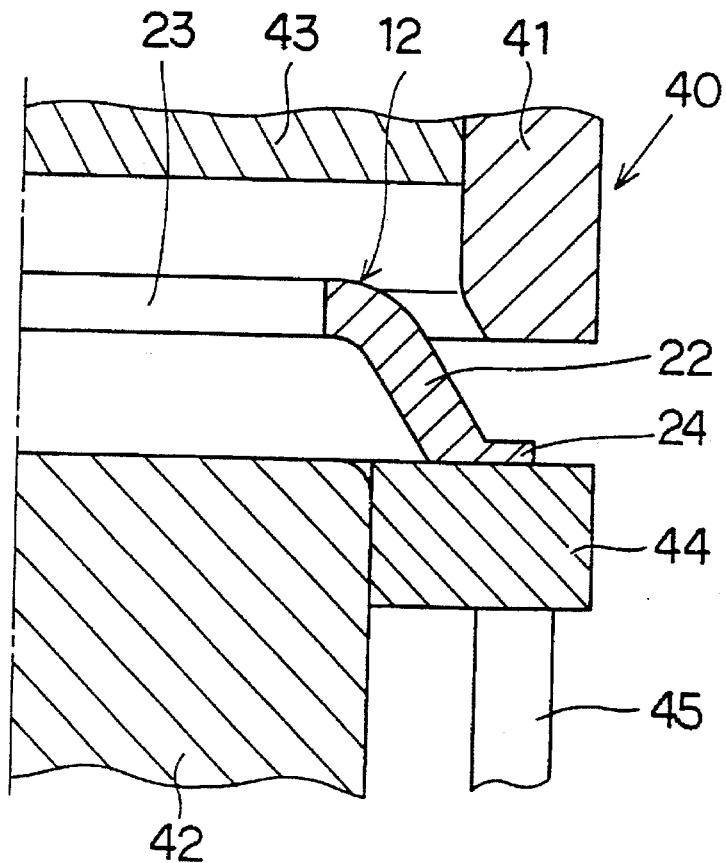

As shown in FIG. 7A, a cup-shaped work without the bottom 11 is inserted between die 41, punch 42 and push plate 44 to be molded into a cup-shaped work without a bottom 12 which has a ring-shaped flange 24 at the outer periphery of side wall 22 (to complete the process). Next, as shown in FIG. 7B, die 41, punch 42 and push plate 44 return to the initial position, so that work 12 can be taken out of press mold 40.

In the above-mentioned flange molding process, flange 24 is molded so that its thickness is thinner (for example t2=4 mm) than that of hot rolled steel plate 8 (for example, t1=8 mm±0.4 mm). A substantially ring-shaped extra portion V1 which is an unnecessary extra volume for the necessary volume to mold poly V-pulley 1 as the final product is formed at the outer periphery of flange 24 in the diameter direction as shown by the non-hatched portion of FIG. 12A.

Figure 9A:
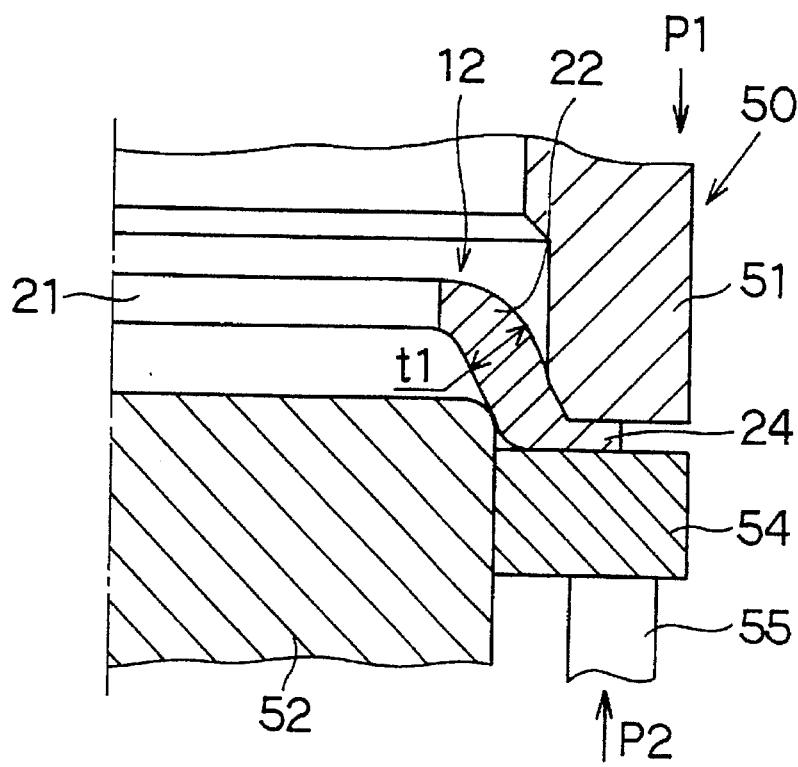
FIGS. 9A and 9B are cross-sectional views of a press mold to perform an edge surface molding process according to the embodiment.
Figure 9B:
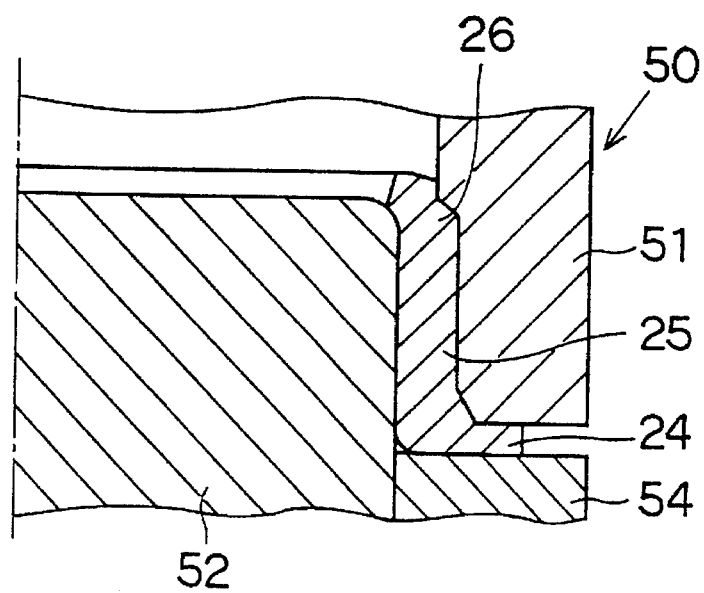
Figure 10A:
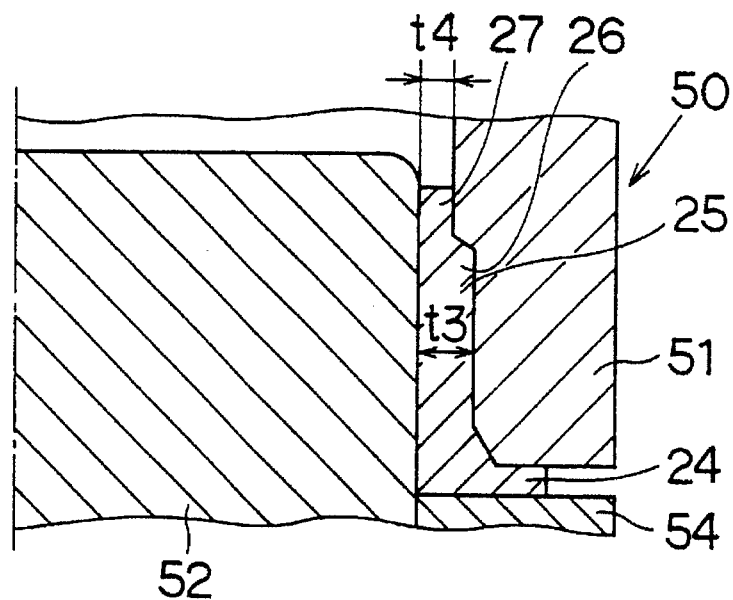
FIGS. 10A and 10B are cross-sectional views of the press mold for performing the edge surface molding process according to the embodiment.
Figure 10B:
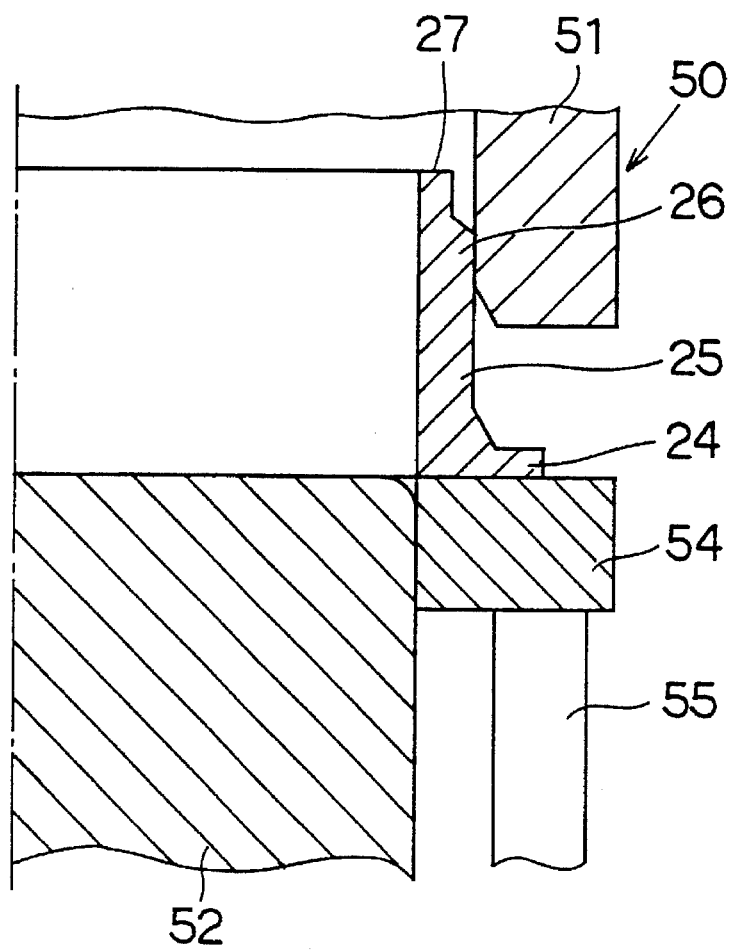
Figure 11:
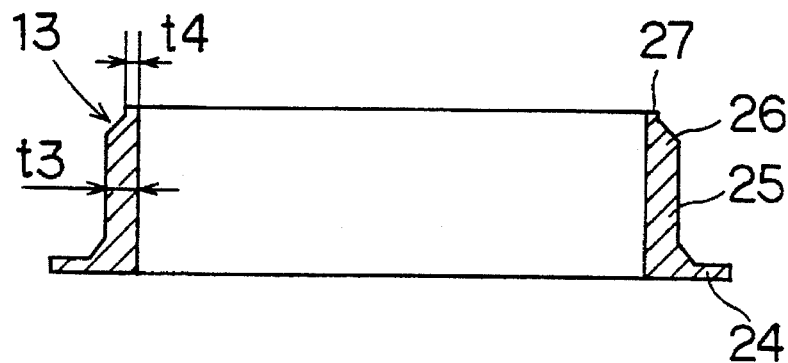
FIG. 11 is a cross-sectional view of a cylindrically-shaped work according to the embodiment.
Figure 12A:
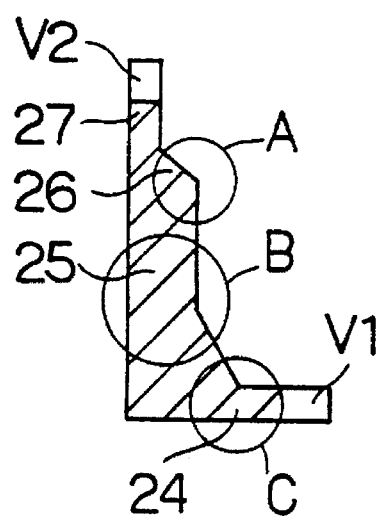
FIGS. 12A and 12B are cross-sectional views of a cylindrically-shaped work.
Figure 12B:
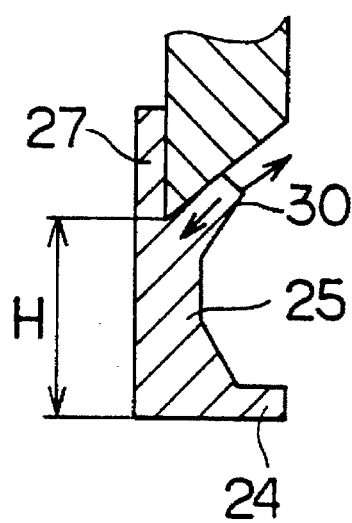

FIGS. 9A–10B show a press mold 50 for performing an edge surface molding process, and FIGS. 11, 12A and 12B show a work 13 molded into a cylindrical shape by press mold 50. Press mold 50 includes a die 51 having a shape enabling it to change the outer periphery of work 12 into a predetermined shape and a punch 52 having a shape enabling it to change the inner periphery of work 12 into a predetermined shape.

A push plate 54 and a push bar 55 ascend by hydraulic power P2 to extrude work 13 from punch 52. Die 51 is cylindrically-shaped and has a molding portion to mold body 25, connected portion 26, and the outer periphery of the smallest diameter portion 27 of work 13 on its inner periphery. Punch 52 has the shape of a cylindrical bar and also has a molding portion to mold body 25, connected portion 26, and the inner periphery of the smallest diameter portion 27 of work 13 on its outer periphery.

In this edge surface molding process, an ironing process of cup-shaped work without the bottom 12 is performed with die 51 and punch 52 of press mold 50. The ironing process is briefly explained hereinafter based on FIGS. 9A–10B. First, cup-shaped work without the bottom 12 is inserted in press mold 50 (to start the process) as shown in FIG. 9A, then die 51 descends by driving power P1 to lower work 12 (in the middle of the process). At this time, push plate 54 lifts work 12 by hydraulic power P2 which is smaller than driving power P1.

As shown in FIG. 10A, cup-shaped work without the bottom 12 is inserted between die 51, punch 52 and push plate 54 to be molded into a cylindrically-shaped work 13 which has a ring-shaped flange 24, a cylindrically-shaped body 25 extending in the axial direction from the inner periphery of flange 24, a truncated cone-shaped connected portion 26 extending in the axial direction from body 25, and the smallest diameter portion extending in the axial direction from connected portion 26 (to complete the process). Next, as shown in FIG. 10B, die 51, punch 52 and push plate 54 return to the initial position, so that work 13 is taken out of press mold 50.

The dimension in the axial direction of work 13 is, for example 30 mm, and its largest outer diameter is, for example, φ 135 mm.

In the above-mentioned edge surface molding process, body 25 is so molded that its thickness is thinner (for example t3=6.2 mm) than that of hot rolled steel plate 8 (for example, t1=8 mm±0.4 mm) and the smallest diameter portion 27 is molded so that its thickness is thinner (for example t4=3.5 mm) than that of body 25. Thus, a ring-shaped extra portion V2 which is an unnecessary extra volume for the necessary volume to mold poly V-pulley 1 as the final product is formed at the top of the smallest diameter portion 27 in the axial direction as shown in FIG. 12A.

Since body 25, connected portion 26, and the smallest diameter portion 27 are molded thinner than hot rolled steel plate 8, an extra portion is not formed around body 25 itself, connected portion 26, and the diameter direction of the smallest diameter portion 27. Therefore work 13 always has a constant volume, as it should be, as shown with a hatched portion in FIGS. 12A and 12B. Portions A and B molded in the edge surface molding process and a portion C molded in the flange molding process always have a constant volume.

Figure 15:
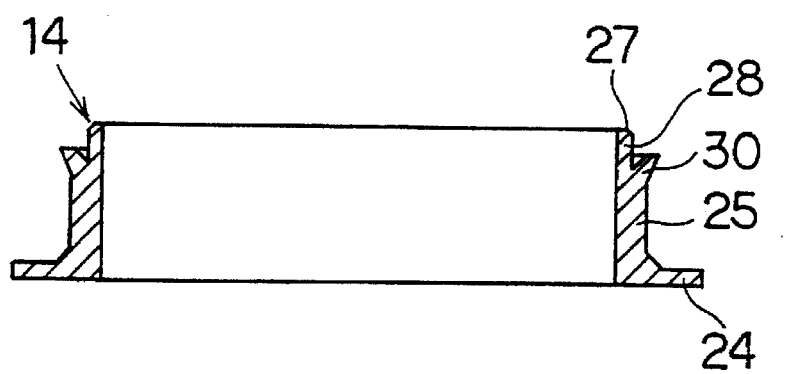
FIG. 15 is a cross-sectional view of a cylindrically-shaped work according to the embodiment.

FIGS. 13A–14B show a press mold 60 for performing a slotting process, and FIG. 15 shows a work 14 molded into a cylindrical shape by press mold 60. Press mold 60 includes a guide 61 to position work 13 and a slotting punch 62 having a shape enabling it to change the outer periphery of work 13 into a predetermined shape.

A push plate 64 and a push bar 65 ascend by driving power P2 to extrude work 14 from guide 61. A stopper 66 regulates the descending movement of push plate 64 to make slotting punch 62 bite into work 13. Punch 62 in the shape of a cylinder has a molding portion to mold the outer periphery of inner periphery side 28 on its inner periphery and has the other molding portion to mold the inner side of the other guide-molded portion 30 on its sloping surface.

Figure 13A:
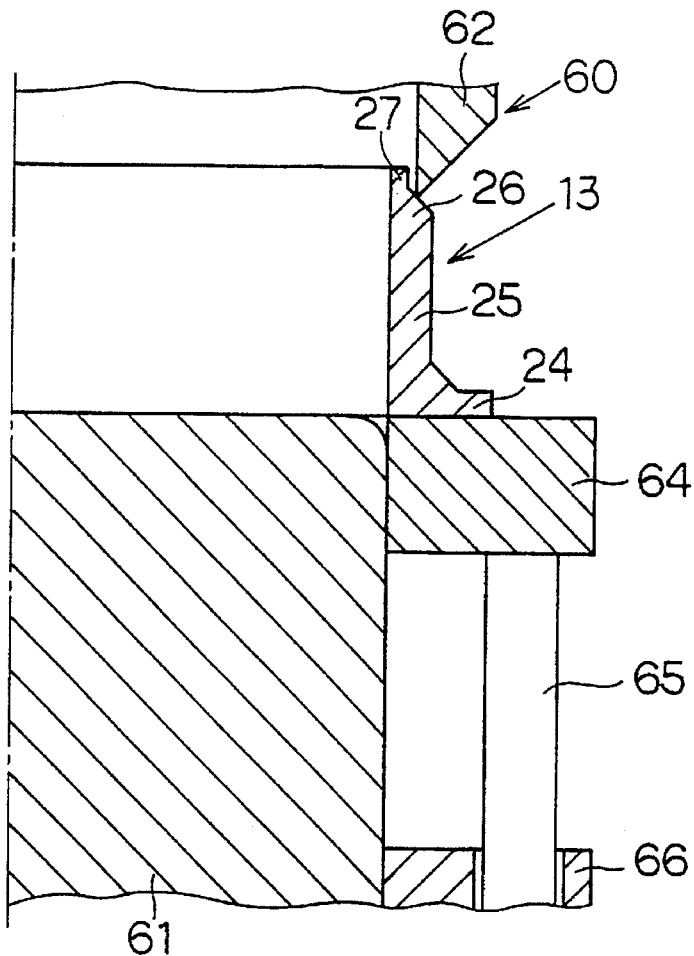
FIGS. 13A and 13B show cross-sectional views of a press mold to perform a slotting process according to the embodiment.
Figure 13B:
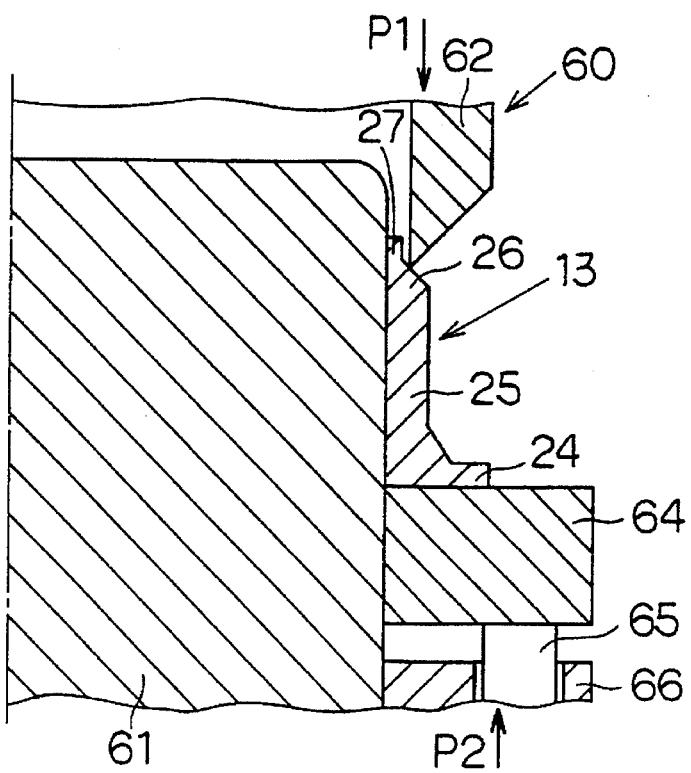
Figure 14A:
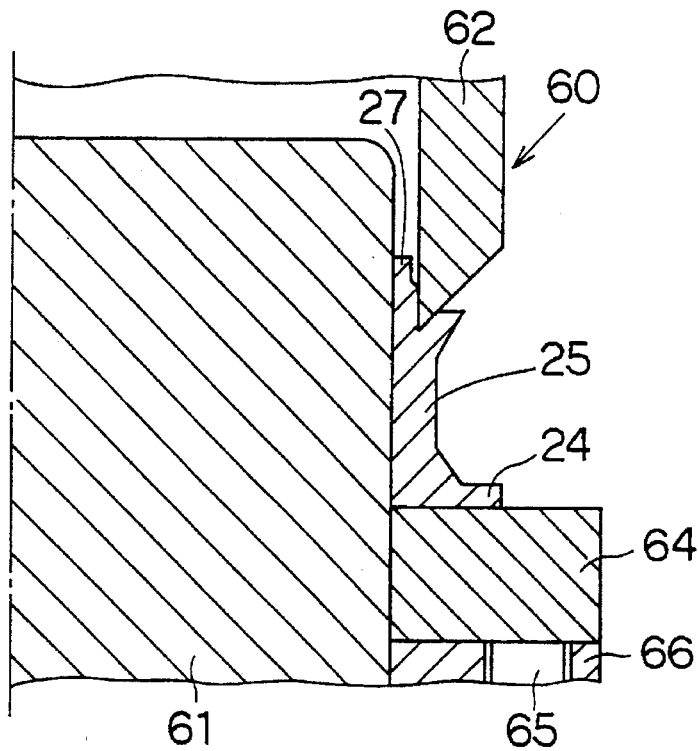
FIGS. 14A and 14B show cross-sectional views of the press mold for performing the slotting process according to the embodiment.
Figure 14B:
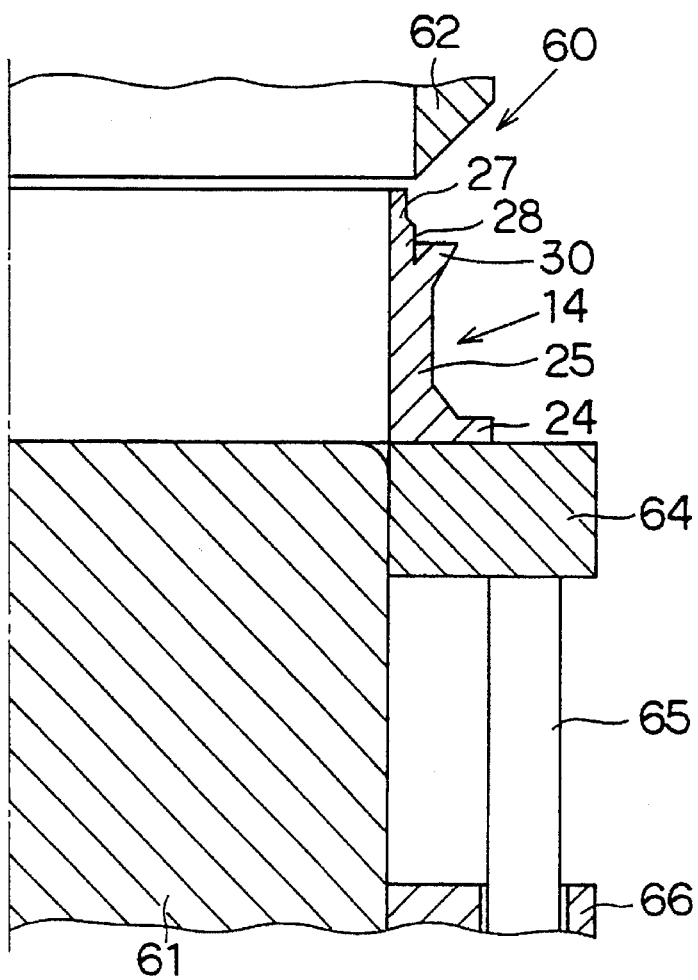

In this slotting process, a slotting process is performed on the outer periphery of connected portion 26 of cylindrically-shaped work 13 with slotting punch 62 of press mold 60. The slotting process is briefly explained hereinafter based on FIGS. 13A–14B. First, cylindrically-shaped work 13 is inserted in press mold 60 (to start the process) as shown in FIG. 13A, then slotting punch 62 descends by driving power P1 to make contact with the outer periphery (i.e., the sloping surface) of connected portion 26 of work 13 (in the middle of the process). As shown in FIG. 14A, cylindrically-shaped work 13 is inserted between slotting punch 62 and push plate 64 to be molded into a predetermined cylindrically-shaped work 14 where the other guide-molded portion 30 is molded at the top of cylindrically-shaped body 25 to complete the process. Next, as shown in FIG. 14B, slotting punch 62 and push plate 64 return to the initial position, so that work 14 is taken out of press mold 60. As shown in FIG. 12B, when the volume of portion A fluctuates in case the driving amount of slotting punch 62 is fixed, the volume of the other guide-molded portion 30 also fluctuates in the direction shown with arrows. In the present embodiment, however, since work 13 is so molded that the volume of portion A becomes constant in the previous edge surface molding process, the volume of the other guide-molded portion 30 after the slotting process becomes constant by fixing the driving amount H of slotting punch 62 in the slotting process. Thus, the dimension in the diameter direction of the other guide-molded portion 30 becomes predetermined without fail.

The other guide-molded portion 30 serves as a base to form belt guide 5 and protrudes to the outside from cylindrically-shaped inner periphery side 28 including the smallest diameter portion 27 with an angle of inclination of, for example, approximately 50°.

Figure 16:
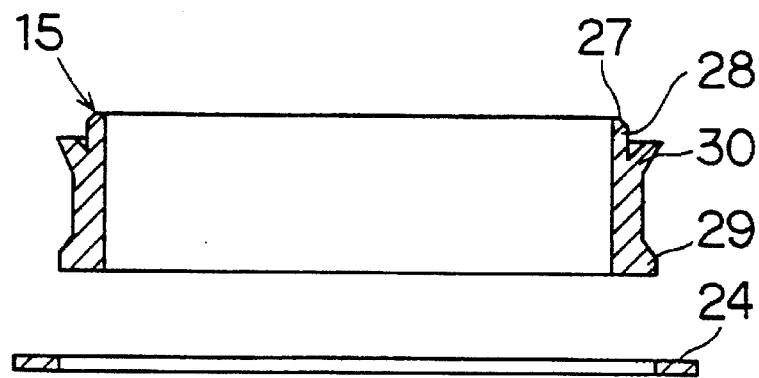
FIG. 16 is a cross-sectional view of a predetermined cylindrically-shaped work according to the embodiment.

FIG. 16 shows a work 15 molded into a predetermined cylindrical shape in the trimming process.

In this trimming process, flange 24 of cylindrically-shaped work 14 is trimmed by shearing with a punch and a die of a press mold (not shown), so that one guide-molded portion 29 serving as a base to form belt guide 4 is molded at the outer periphery of one end of body 25.

In the above-described slotting and trimming processes, an extra portion V1 shown in FIG. 12A is removed from a work 15 with flange 24. Since extra portion V2 does not affect the volume of the other guide-molded portion 30 whether extra portion V2 is cut off or not, it is not removed in the present embodiment.

Figure 17:
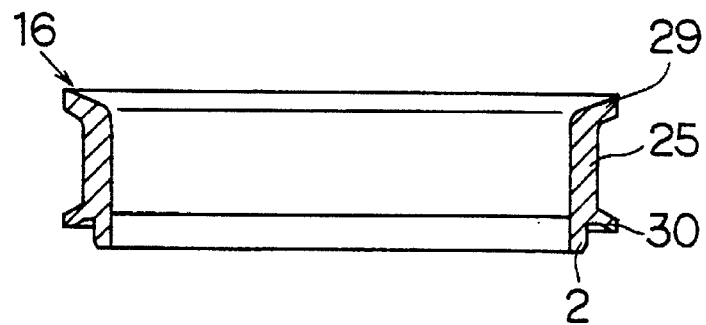
FIG. 17 is a cross-sectional view of the predetermined cylindrically shaped work according to the embodiment.

FIG. 17 shows a work 16 molded into a predetermined cylindrical shape in the belt guide molding process.

In this belt guide molding process, a rotary molding process is performed on a cylindrically-shaped work 15, so that the inner and outer diameters of body 25, one guide-molded portion 29, and the other guide-molded portion 30 can be predetermined diameters, and by transforming the shape of one guide-molded portion 29, cylindrically-shaped connected portion 2, cylindrically-shaped body 25, and a pair of belt guides 4 and 5 are also formed.

Figure 19:
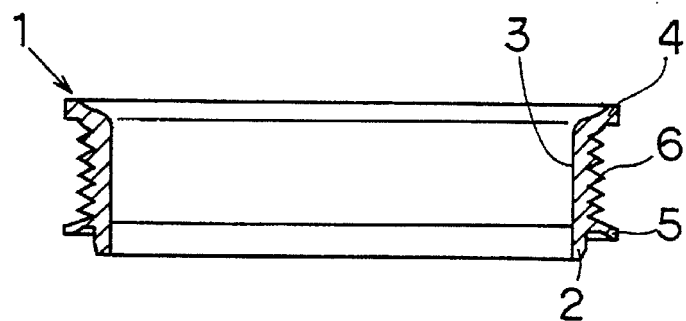
FIG. 19 is a cross-sectional view of the poly V-pulley manufactured according to the embodiment of the present invention.
Figure 18A:
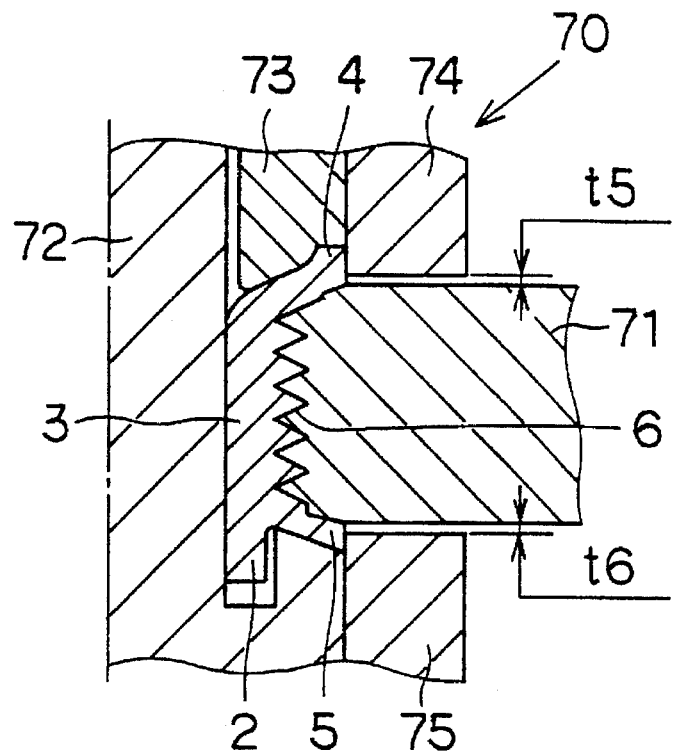
FIG. 18A is a cross-sectional view of a press mold for performing a V-groove molding process according to the embodiment.

FIG. 18A shows a V-groove rolling machine 70 for performing a V-groove molding process. FIG. 19 shows poly V-pulley 1 molded into a predetermined cylindrical shape by V-groove rolling machine 70. V-groove rolling machine 70 comprises a V-groove molding roller 71 for rolling and guides 72–75 for positioning work 16 as shown in FIG. 18A. Reference figures t5 and t6 are clearances between V-groove molding roller 71 and guide 74, and V-groove molding roller 71 and guide 75, respectively, which are 0.1 mm in the present embodiment.

In this V-groove molding process, V-roll molding is performed on predetermined cylindrically-shaped work 16 to roll the outer periphery of body 25 in order to form a multi-stage V-groove between a pair of belt guides 4 and 5. In the above-described manufacturing processes, cylindrically-shaped poly V-pulley 1 having connected portion 2, cylindrically-shaped body 3, a pair of belt guides 4 and 5, and multi-stage V-groove 6 is manufactured. The size of poly V-pulley 1 is, for example, 30 mm in the axial direction and φ 125 mm at its outer diameter.

Figure 18B:
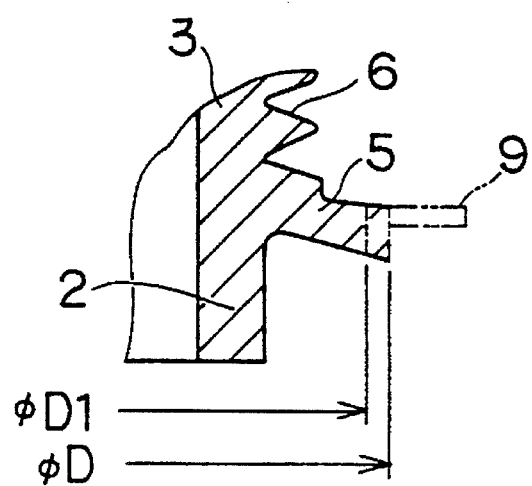
FIG. 18B is a cross-sectional view of a predetermined cylindrically-shaped work according to the embodiment.

As for poly V-pulley 1 manufactured according to the above-mentioned method, even if sash-shaped hot rolled steel plate 8 has an uneven thickness, the uneven thickness or fluctuation of precision of hot rolled steel plate 8 can be solved in the middle of the manufacturing process, i.e., in the slotting and trimming processes). Poly V-pulley 1 is free from a flash 9, i.e., a portion bulging out of the clearance caused by excessive volume in the process prior to the V-groove molding process as shown in FIG. 18B. If a predetermined diameter (for example, φ 125 mm) φ D cannot be obtained due to lack of volume, the diameter becomes shorter; however, the present embodiment can prevent it from having a shorter diameter φ D1, so that the outline of poly V-pulley 1 becomes a complete circle and especially the outline of a pair of belt guides 4 and 5 becomes perfectly round.

As a result, eccentricity of poly V-pulley 1 caused by imbalanced and uneven thickness can be prevented, so that the rotation of poly V-pulley 1 does not fluctuate, thereby suppressing negative influences on the refrigerant compressor. That is, the shaft of the refrigerant compressor does not abnormally abrade and vibrate, which results in longer life of the shaft bearing.

In the present embodiment, the present invention has been applied to a method of manufacturing a poly V-pulley of an electromagnetic clutch; however, the present invention can also be applied to a method of manufacturing a poly V-pulley or a V-pulley of an alternator or a super charger as well as a crank shaft pulley and an idle pulley for V-belt tension.

Figure 20:
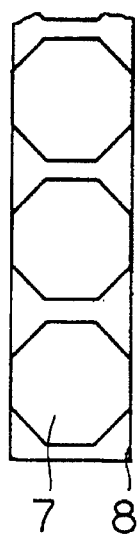
FIG. 20 is a top plan view of a hot rolled steel plate according to a variation of the embodiment.

In the step of punching pulley material from the sash-shaped metal material, the shape of the punched works need not be perfectly circular. For example, the punched works may be polygonal (for example, octagonal) in shape, as shown by work 7' in FIG. 20. Compared to circular punched works, polygonal punched works can be arranged on the sash-shaped material more efficiently to minimize wasted space, i.e., the portions of the sash-shaped material not included in one of the punched works. Moreover, the minimum margin required between an individual polygonal punched work and another such work or between the individual punched work and an edge of the sash-shaped material can be reduced in comparison with a circular punched work of comparable size.

In the edge surface molding process according to the present embodiment, body 25, connected portion 26, and the smallest diameter portion 27 have been formed, however, in the same process, only body 25 and the smallest diameter portion 27 may be formed. In that case, the top of body 25 and the bottom of the smallest diameter portion 27 can be formed in a stepped shape. Moreover, in the slotting process, slotting punch 62 can be driven in at any appropriate portion having a larger diameter than the smallest diameter portion 27 based on the shape of the other guide-molded portion 30.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method of manufacturing a V-pulley, having a pair of belt guides at an outer periphery thereof, for maintaining positions of both sides of a V-belt, said method comprising the steps of:

punching a sash-shaped metal material to cut off pulley material from said metal material;

punching a fixing hole in said pulley material manufactured in the sash-shaped metal material punching step, and drawing a first end of said pulley material to form a substantially ring-shaped flange thinner than said metal material at said first end of said pulley material;

ironing a second end of said pulley material manufactured in the fixing hole punching step to form a cylindrically-shaped body thinner than said metal material and to form a cylindrically-shaped smallest diameter portion at a top of said body;

forming a predetermined cylindrically-shaped pulley material having a pair of guide-molded portions and forming said pair of belt guides from said guide-molded portions, wherein one guide-molded portion of said pair of said guide-molded portions is formed at one end of said body by trimming said fl;ange of said pulley material manufactured in the fixing hole punching step, and another one of said pair of guide-molded portions is formed at another end of said body by slotting an outer periphery side of said smallest diameter portion of said body of said pulley material manufactured in said ironing step.

2. The method of claim 1, wherein said sash-shaped material punching step is performed using a press mold punch and die.

3. The method of claim 1, wherein said punching step comprises a step of punching round pulley material out of said sash-shaped material.

4. The method of claim 1, wherein said punching step comprises a step of punching polygonal pulley material out of said sash-shaped material.

5. The method of claim 4, wherein said polygonal pulley material is octagonal pulley material.

6. The method of claim 1, wherein said fixing hole punching step is performed using a press mold punch and die.

7. The method of claim 1, wherein said ironing step comprises a step of forming a body, connecting portion and smallest diameter portion from said pulley material manufactured in said fixing hole punching process.

* * * * *